United States Patent [19]

Conrad

[11] Patent Number: 5,237,889
[45] Date of Patent: Aug. 24, 1993

[54] SELF-LOCKING ACCELERATOR PEDAL CABLE-CARBURETOR THROTTLE LEVER MECHANISM

[75] Inventor: James A. Conrad, Farmington Hills, Mich.

[73] Assignee: Ford Motor Company, Dearborn, Mich.

[21] Appl. No.: 716,145

[22] Filed: Jun. 17, 1991

[51] Int. Cl.⁵ .................................................. F16C 1/10
[52] U.S. Cl. .............................. 74/502.4; 74/501.5 R; 403/317; 403/325
[58] Field of Search ............... 74/513, 501.5 R, 501.6, 74/502.4, 502.6, 500.5, 502; 403/317, 325, 327, 328, 319

[56] References Cited

U.S. PATENT DOCUMENTS

| | | | |
|---|---|---|---|
| 2,489,163 | 11/1949 | Schwimmer | 74/501.5 R |
| 3,115,225 | 12/1963 | Fraylick et al. | 74/502.4 |
| 3,362,050 | 1/1968 | McCarthy | 403/325 |
| 3,516,299 | 6/1970 | Conrad | 74/501.6 |
| 3,653,277 | 4/1972 | Gilmore | 74/502 |
| 3,929,031 | 12/1975 | Webb | 74/501.5 R |
| 4,038,881 | 8/1977 | Conrad | 74/501.5 R |
| 4,225,261 | 9/1980 | Marx | 403/319 |
| 4,339,148 | 7/1982 | Smith et al. | 403/328 |
| 4,441,836 | 4/1984 | Boda | 403/317 |
| 4,504,167 | 3/1985 | Nakanishi | 403/325 |
| 4,520,546 | 6/1985 | Darnell | 403/327 |
| 4,625,579 | 12/1986 | Spease | 74/501.5 R |
| 4,694,705 | 9/1987 | Frankhouse et al. | 74/501.5 R |
| 4,726,251 | 2/1988 | Niskanan | 74/502 |
| 4,790,206 | 12/1988 | Thomas | 74/501.6 |
| 4,829,845 | 5/1989 | Suzuki | 74/502.4 |
| 4,872,367 | 10/1989 | Spease | 74/501.5 R |
| 5,031,737 | 7/1991 | Dzioba et al. | 74/502.6 |

FOREIGN PATENT DOCUMENTS

| | | | |
|---|---|---|---|
| 0261083 | 3/1988 | European Pat. Off. | 403/325 |
| 1951448 | 12/1970 | Fed. Rep. of Germany | 403/327 |

Primary Examiner—Carl D. Friedman
Assistant Examiner—Winnie Yip
Attorney, Agent, or Firm—J. R. Drouillard; Roger L. May

[57] ABSTRACT

A self-locking connector for pivotably interconnecting a carburetor throttle valve member to a cable connected vehicle accelerator pedal member includes a nailhead-like pin projecting from the one member for insertion through a keyhole slot in the other member, the other member having a movable retainer/cover normally biased to a position overlying the slot prior to assembly of the two members, the retainer/cover being retractable to uncover the slot and permit passage of the pinhead through the slot, return movement of the retainer/cover engaging the ends of the retainer/cover with the pinhead moving it into the smaller diameter portion of the keyhole slot and engaging the end of the retainer/cover under the head of the pin preventing withdrawal of the pin from the slot and locking the two members pivotably together.

6 Claims, 3 Drawing Sheets

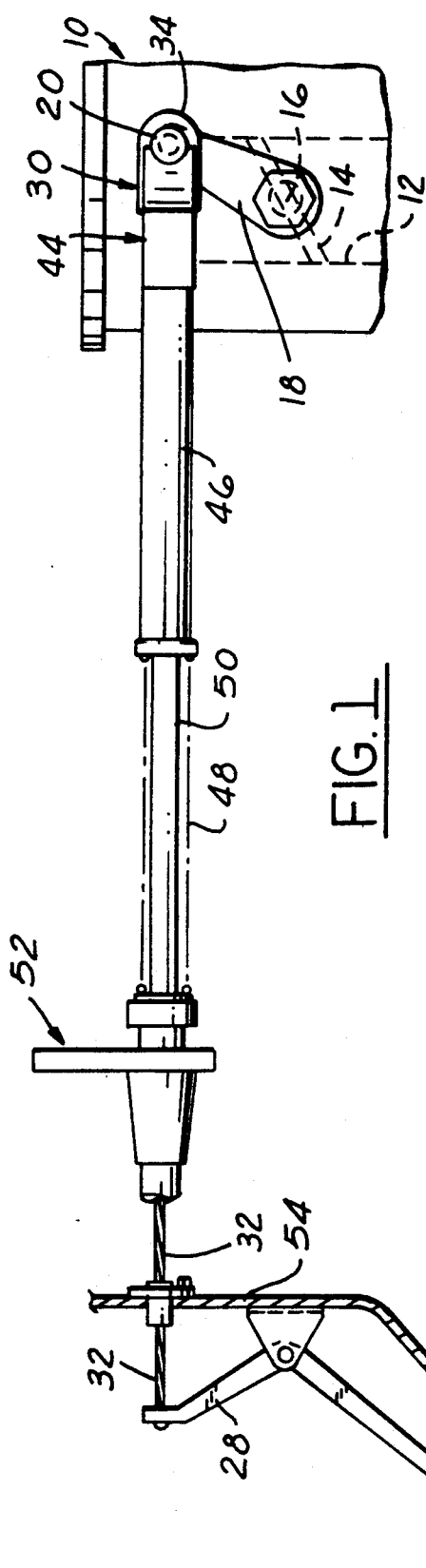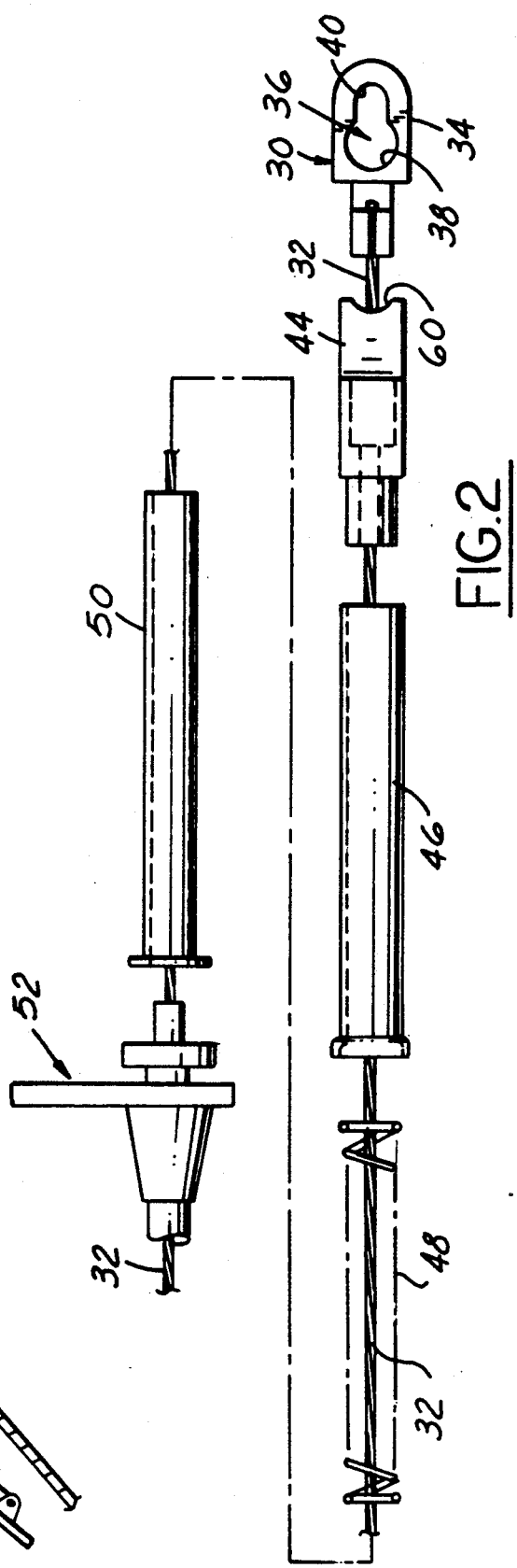

SELF-LOCKING ACCELERATOR PEDAL CABLE-CARBURETOR THROTTLE LEVER MECHANISM

FIELD OF THE INVENTION

This invention relates in general to a motor vehicle. More particularly, it relates to a means for interconnecting the motor vehicle carburetor throttle lever to the vehicle accelerator pedal movable cable by a self-locking mechanism.

BACKGROUND OF THE INVENTION

With the advent of low profile hoods on motor vehicles, the open spaces within the engine compartment have become increasingly less to the point where it is often difficult to provide proper connections because of the restricted access. For example, as shown in the drawing labeled "Prior Art," a typical known connection between a carburetor throttle lever and and the vehicle accelerator pedal has been of the ball stud and socket type. The latter installation requires a minimum vertical space of at least 24 mm to permit insertion of the installer's fingers or other equipment for assembly of the ball socket to the stud.

As stated previously, the designs as they are evolving today are reducing the available clearance to provide, inter alia, compactness to the engine compartment of the vehicle. Accordingly, alternative constructions, such as that of the invention to be described, must be provided. This invention minimizes the problem by providing for assembly of the components described with approximately little more than half of the minimum clearance space required for the devices of the prior art.

The invention is directed specifically to a self-locking connector construction that requires a minimum vertical clearance space for assembly, and yet provides for an easy installation with a simplicity of parts. More specifically, it includes a nailhead-like pin secured to one of the two members to be connected, the other member being provided with a keyhole-like slot connector for receiving the pin. The latter member includes a slidable retainer that is spring biased to normally cover the keyhole slot but which can be retracted to permit the through passage of the pin. The pin is subsequently moved by the retainer into the smaller of the two openings of the keyhole slot and the two members are locked together by the retainer moving to a position preventing release of the pin from the hole.

The known prior art in general fails to show or describe the simplified self-locking connector of this invention. The prior art includes various features that are somewhat related in that they are used in some cases for connecting the throttle valve of a motor vehicle to another member or a transmission member, or show a locking device; however, the prior art lacks the simplified teaching and details of construction and operation of the self-locking device according to the invention.

For example, U.S. Pat. No. 4,694,705, Frankhouse et al., shows merely a Push/pull snap-on type connector of a ball and socket for use with an engine throttle lever or a transmission lever. This is similar to the prior art previously described and shown herein and consists of a ball peen type end of a movable lever snapped into a retainer for a pivotal non-linear movement relative to it.

U.S. Pat. No. 4,038,881, Conrad, shows a common eyelet end type of connector 118 having a hole 119. It also shows a coiled biasing spring 56. The device retains a cylindrical member inside a sleeve with a small neck portion.

U.S. Pat. No. 4,872,367, Spease, is another illustration of an arcuately movable member with a hole in the end of the connector for operating a cruise control. A lost motion inkage ball-like member retained in a sleeve is provided.

U.S. Pat. No. 4,829,845, Suzuki, illustrates a locking type connector in which a flat sided cable conduit sleeve 11 with screw threads engages a rotatably movable sleeve 12. Once engaged, the member 13 prevents rotation of sleeve 12 and, therefore, the shaft 11, and fixes the position of anchor 3. The prior art in FIG. 10, a resilient finger-type retainer, has an outer tooth member cooperating with a retainer 59 with mating teeth.

U.S. Pat. No. 3,653,277, Gilmore, again shows an eyelet type connector having a compression spring, 12, biasing the connector 3 outwardly, but permitting inward movement by means of the pin 11 moving the member 6 to which the cable is attached. In this case, the push/pull control is for operating the hood release lever of a motor vehicle.

U.S. Pat. No. 4,726,251, Niskanen, shows a ball and swivel socket section and a flexible finger-type socket attaching assembly. It shows interlocking tabs 30 and apertures 34 in a vibration isolation mechanism that permits disassembly of the device during relative longitudinal or axial movement.

U.S. Pat. No. 3,929,031, Webb, again shows an eyelet type connector having a locking mechanism with flexible fingers; the fingers are angled to dig into the member sleeve 20 in one direction of movement and to thereby normally lock it against movement in that direction.

As will be evident, the prior art is directed more to the construction, per se, of the individual members to be connected rather than the specific connection of the end of one lever to another in a self-locking manner to Permit pivotal movement between the two while preventing separation therebetween.

SUMMARY OF THE INVENTION

As stated previously, the invention is directed to a self-locking mechanism for connecting the vehicle accelerator pedal operated cable to the carburetor throttle lever within a confined area of such restriction as to preclude or render more difficult assembly using conventional or known connectors.

It is a primary object of the invention, therefore, to provide a self-locking connector that is simple in construction, requires a minimum vertical clearance space for assembly or disassembly and, therefore, is readily adaptable to modern-day vehicles with low profile hoods and crowded engine compartments establishing very little clearance spaces for attachment of elements to one another.

Another object of the invention is to provide a self-locking connector of the type described above in which one of the elements or members has at its end a keyhole-type slot and a retainer that is slidable over the slot to block the same, the other member to be connected containing a nailhead-type pin that is insertable through the larger aperture opening of the slot and then movable into the smaller opening to detachably connect the two members together, the retainer being slidable in a direction away from the slot to unblock the opening to permit entry of the pin, and in a return direction against the pin to move it into the smaller diameter portion of the slot while simultaneously engaging the underside of the head of the pin to prevent withdrawal of the pin from the slot to thereby lock the two members together.

BRIEF DESCRIPTION OF THE DRAWINGS

Other objects, features and advantages of the invention will become more apparent upon reference to the succeeding, detailed description thereof, and to the drawings illustrating the preferred embodiments thereof, wherein:

FIG. 1 is a cross-sectional view schematically illustrating the interconnection between a vehicle accelerator pedal and the engine carburetor embodying the invention;

FIG. 2 is an exploded view of the connector illustrated in FIG. 1;

DESCRIPTION OF THE PREFERRED EMBODIMENT

Figure 3:
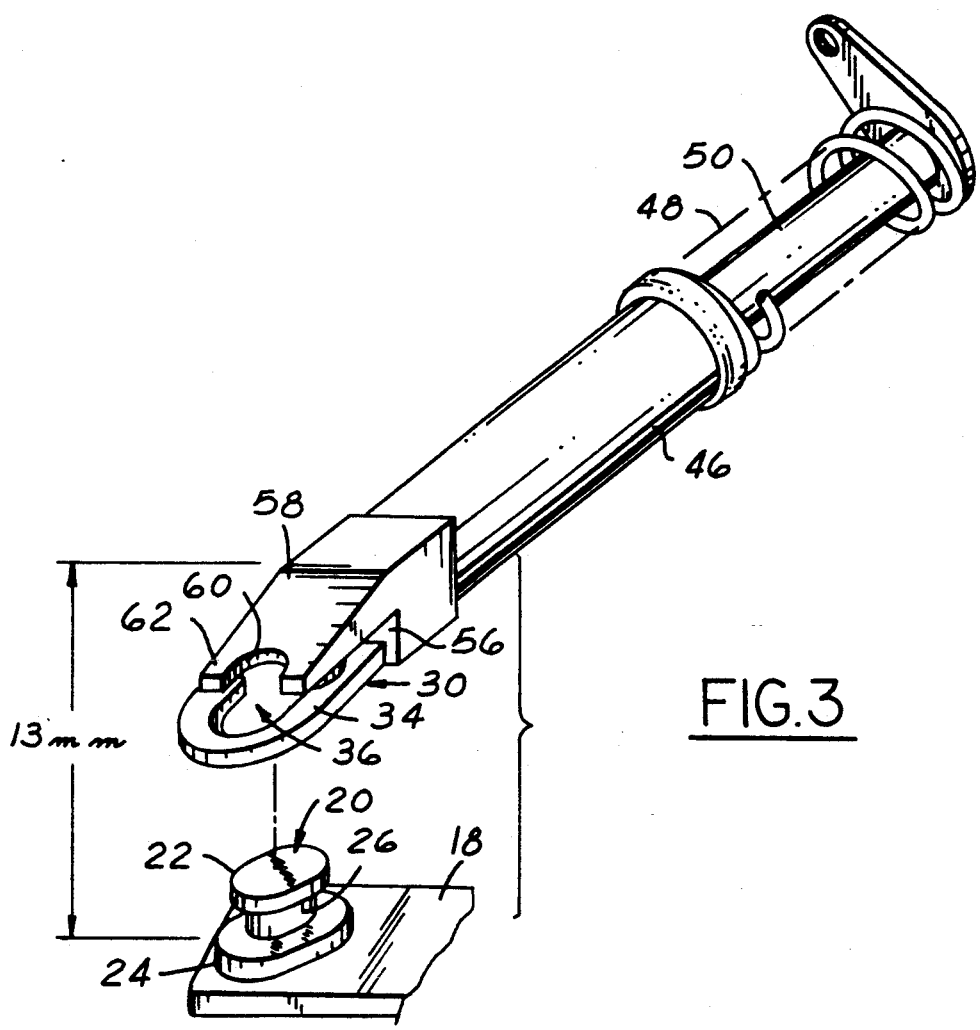
FIG. 3 is an enlarged perspective view of the connector of FIG. 2.

FIG. 1 illustrates schematically a portion of the controls for an automotive type engine. They include a carburetor illustrated partially at 10 having a conventional downdraft type air passage 12. A butterfly-type of throttle valve 14 is fixed on a shaft 16 rotatably mounted in the walls of the carburetor. Fixed at its lower end on shaft 16 is a lever 18 that has as its upper end a nailhead type or shaped pin 20, as shown more clearly in FIG. 3. The pin consists of a smaller head land portion 22 and a larger diameter land 24, interconnected by a neck portion 26 of reduced diameter. Those skilled in the art will appreciate in view of this disclosure that the present invention could be employed not only with conventional carburetors, but also with conventional throttle bodies used with fuel injection systems, or with fuel injection pumps, such as those used with Diesel engines.

The pin 20 in this case is adapted to connect the throttle lever 18 with the vehicle accelerator pedal lever 28 through a connecting member indicated in general at 30 and a cable 32.

Referring now to FIGS. 1-3 and 4A-E, the connecting member 30 has at its end a flat connector 34 having a keyhole slot 36 having a larger diameter opening 38 interconnected with a smaller diameter opening 40. Connector 34 is fixedly connected to the cable core wire 32 and cooperates with a retainer member 44. The latter is slidable partially into a dust tube 46, the other end of which is abutted by a compression spring 48 that surrounds a spring guide 50. The latter reacts against a stationary cable conduit and fitting assembly indicated at 52. As shown in FIG. 1, assembly 52 is fixed to the engine firewall indicated at 54 through which cable 32 projects for connection to the foot pedal operated accelerator pedal lever 28. FIGS. 1 and 3 show the elements in assembled condition. The one end of retainer 44 is nested in dust tube 46 and the adjacent end of compression spring 48 seated against the opposite end of the dust tube, with spring guide 50 nested within spring 48.

Figure 4A:
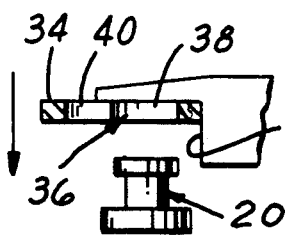
FIGS. 4A-4E are views illustrating the progressive steps for the interconnection and locking of the two members together to be connected.

Turning now to the retainer 44, the latter is slidably mounted with respect to the cable core wire 32 so that it can be extended or moved to a position covering or blocking the larger chamber opening 38 of slot 36, as seen in FIGS. 3 and 4A. Alternatively, it can be retracted to a position away from covering opening 38 to the position shown in FIGS. 2 and 4D. More specifically, the retainer 44 is constructed with an L-shaped or shelf-like end 56 providing a plate-like or finger-like projection 58 that constitutes a cover or blockage member for the slot 36. The cover plate 58 contains an arcuate cutout 60 of a diameter just slightly larger than the neck portion 26 of pin 20 for a purpose to be described.

As will be clear from a consideration of FIGS. 2 and 3, the compression spring 48 normally urges the dust cover 46 and retainer 44 in the position shown in FIGS. 1 and 3 covering the larger diameter portion or aperture 38 of slot 36. The retainer, however, can be manually retracted against the force of compression spring 48 to move retainer 44 to a position similar to that shown in FIGS. 2 and 4C, 4D, uncovering the keyhole slot 36 completely. At that time, the larger diameter portion 38 of the slot can be moved down over the land 22, as well as the neck portion 26 of the pin, to position the neck portion in a location for movement into the smaller opening 40 of the keyhole slot 36. This is more clearly illustrated in FIGS. 4A-4E.

Figure 4B:
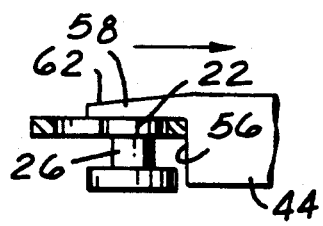
Figure 4C:
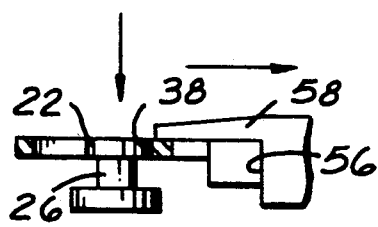
Figure 4D:
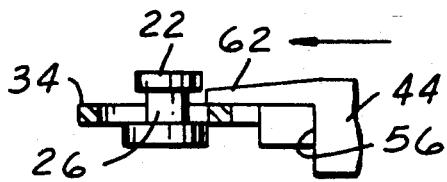
Figure 4E:
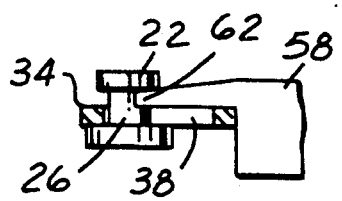

FIG. 4A shows the retainer 44 and nailhead pin 20 in position to be assembled or connected. FIG. 4B shows the position of the parts as retainer 44 is lowered down over the pin permitting the pin head land portion 22 to enter into the slot but not through it. FIG. 4C shows the retainer cover plate 58 retracted rightwardly as seen in the figure, against the force of spring 48, to uncover the keyhole slot 38. This now permits downward movement of retainer 44 to the position shown in FIG. 4D placing the pin 20 through slot 38 and the slot aligned with the reduced diameter neck portion 26 of the pin. At this point, as seen in FIG. 4E, release of the retainer causes compression spring 48 to move retainer 44 leftwardly to locate the cover plate recessed portion 60 (FIG. 3) against neck portion 26. This moves the neck portion 26 into the smaller diameter opening 40 of the keyhole slot, while simultaneously moving the finger-like or edge portions 62 of the retainer under the head land portion 22, thereby locking pin 20 from vertical withdrawal from the slot and positively interconnecting and locking the carburetor throttle lever 18 to cable 32 connected to the vehicle accelerator pedal.

Figure 5A:
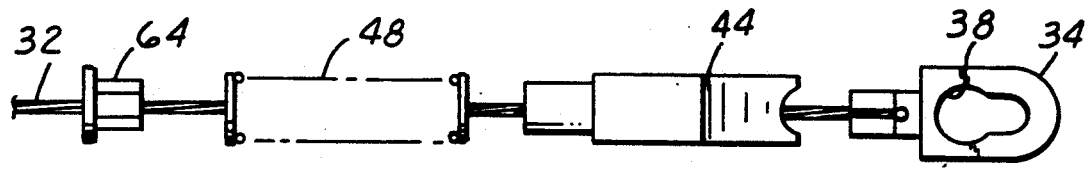
FIG. 5A is an exploded view of another embodiment of the invention.
Figure 5B:
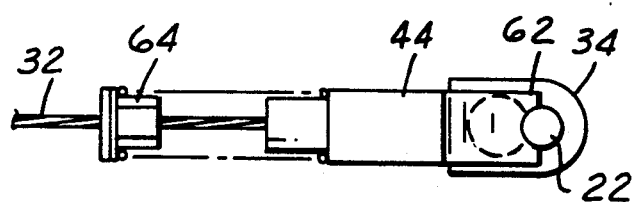
FIG. 5B is a drawing similar to FIG. 5A showing the latter construction assembled.
Figure 6:
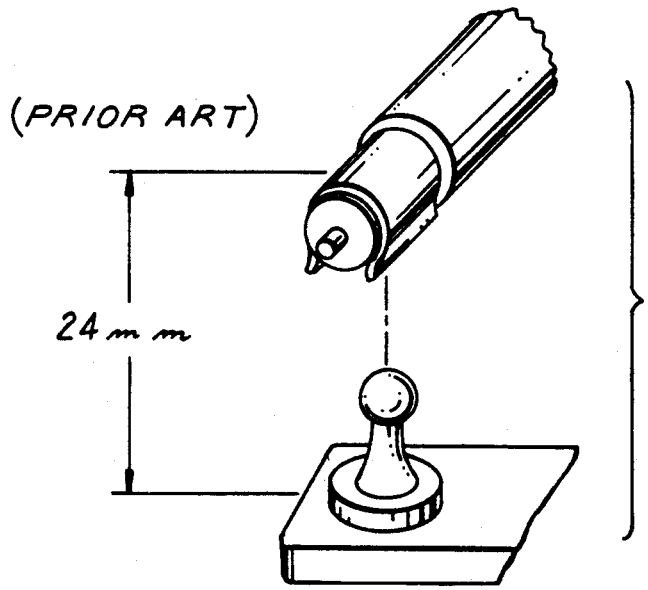
FIG. 6 is a perspective view of a prior art ball stud and socket type of carburetor throttle lever and cable connection.

FIGS. 5A and 5B show an alternative connection to that of the construction of FIGS. 1-4. More specifically, in FIG. 2, it will be noted that the spring guide 50 seats against the stationary cable conduit and fitting assembly 52 and, therefore, constitutes a reaction member for compression spring 48. This helps restore the vehicle accelerator pedal and carburetor throttle valve to their initial closed throttle positions, as well as serving as a retention spring for maintaining the retainer in the locking position.

FIGS. 5A and 5B show the use of a spring guide 64 that is crimped to the cable core wire 32 instead of surrounding it loosely as in FIG. 2. As a result, spring guide 64 does not act as a reaction member and merely causes the compression spring 48 to act only as a retention member to maintain or bias the retainer to its initial position covering the keyhole slot 36, or its locking non-retracted position. In all other respects, the embodiment of FIGS. 5A and 5B operate in the same manner as that described in connection with FIGS. 1-4.

The operation of the invention is believed to be clear from the above description and a consideration of the drawings, and therefore, will not be repeated in detail. Suffice it to say, however, that for interconnection of the carburetor throttle lever 18 and the cable 32 connected to the vehicle accelerator pedal, the retainer shown in FIGS. 1-4 is initially manually retracted against the force of spring 48 to uncover the large portion of keyhole slot 34, permitting the nailhead pin 20 to pass through the slot upon downward movement of the retainer to a position aligning the cutout 12 or yoke 60 with the intermediate reduced diameter neck portion 26 of the pin. Thereafter, release of the retainer will effect its return movement by spring 48 to the position shown in FIG. 4E, pushing the pin neck portion 26 into the smaller diameter slot opening 40 and locating the edge portions 62 of the retainer under the land or head of pin portion 22. This, therefore, locks the cable connected members to the throttle body lever for concurrent operation upon depression of the vehicle accelerator pedal.

From the above, it will be seen that the invention provides a self-locking mechanism for connecting the carburetor throttle lever pivotably with the vehicle accelerator pedal connected cable within a minimum vertical clearance space. As clearly indicated by comparison of the prior art shown herein and FIG. 3, the 13 mm clearance space indicated in FIG. 3 for assembly of the interconnecting mechanism of the invention is slightly more than half of that required to install the conventional or known ball stud-socket type connector.

While the invention has been shown and described in its preferred embodiments, it will be clear to those skilled in the arts to which it pertains, that many changes and modifications may be made thereto without departing from the scope of the invention.

I claim:

1. A self-locking mechanism for interconnecting a vehicle accelerator pedal connected cable to a carburetor throttle body member, including a first lever and a second member operably connected, respectively, to the carburetor throttle body and to the vehicle accelerator pedal for concurrent movement, the first lever having a nailhead shaped pin projecting from one end having a head portion and a smaller diameter portion, the second member having a keyhole shaped slot at an end with larger and smaller opening portions for receiving the pin therethrough to connect the lever and member together pivotally, and a retainer movably fixed on the second member, means biasing the retainer to an initial position overlying a portion of the slot preventing movement of the pin therethrough, the retainer being movable against the biasing means to a position uncovering the slot portion for subsequent admission therethrough of the head portion and at least a portion of the smaller diameter portion of the pin, return of the retainer towards the initial position subsequent to admission of the latter pin portions through the slot engaging the retainer with the pin and forcing the pin into the smaller opening portion of the slot and the retainer under the head portion of the pin to lock the lever and member together.

2. A self-locking mechanism for interconnecting a vehicle accelerator pedal connected cable to a carburetor throttle body member, including a first lever and a second member operably connected, respectively, to the carburetor throttle body and to the vehicle accelerator pedal for concurrent movement, the first lever having a nailhead shaped pin projecting from one end having a head portion and a smaller diameter portion, the second member having a keyhole shaped slot at an end with larger and smaller opening portions for receiving the pin therethrough to connect the lever and member together pivotally, and a slidable retainer means having a spring biased position initially covering at least a portion of the slot to block movement of the pin therethrough, the retainer being slidably movable against the spring bias to uncover the slot to permit passage of the pin therethrough, release of the retainer towards the spring biased position subsequent to passage of a portion of the pin through the slot and moving the retainer against the pin and under the head portion of the pin to lock the pin in the smaller opening portion of the slot for preventing withdrawal from the slot and concurrently locking the lever and member pivotably together.

3. A self-locking mechanism as in claim 1, wherein the retainer includes a cover extending from the second member to the initial position overlying the larger opening portion of the keyhole slot, spring means biasing the cover and retainer to the initial position, the retainer being so constructed and arranged as to be movable against the spring means to uncover the larger opening portion of the slot to permit passage of at least the head of the pin through the slot, the head of the pin being of a greater size than the smaller opening portion of the slot, the smaller diameter portion constituting a neck portion of a diameter less than that of the smaller opening slot portion permitting sidewise movement of the pin neck portion into the smaller opening slot portion to lock the pin and second member together.

4. A self-locking mechanism as in claim 3, the cover comprising a plate-like element secured to the second member, withdrawal of the retainer cover from the position overlying the slot permitting downward movement of the cover below the head portion of the pin whereupon subsequent release of the cover and the bias of the spring means engages the cover with the smaller diameter portion of the pin urging the same into the smaller diameter opening portion of the slot.

5. A self-locking mechanism for interconnecting a vehicle accelerator pedal connected cable to a carburetor throttle body lever, including a first lever connected to the carburetor throttle body and having a nailhead type pin at one end projecting outwardly therefrom, the pin including first head portions of a large diameter connected to a neck-like portion of lesser diameter, a second member cable connected to the vehicle accelerator pedal for movement thereby, the second member having a keyhole slot shaped aperture at one end for a mating cooperation with the pin upon insertion of the pin through the aperture, the aperture including a first portion of a diameter larger than the pin large diameter head portion, and a second aperture portion having a diameter between the lesser and large pin portion diameters, and a spring biased movable retainer normally overlying a portion of the slot preventing movement of the large diameter pin portion through the slot, the retainer being movable away from the aperture against its spring bias to permit insertion of the large and lesser diameter pin portions through the slot, release of the retainer moving the, retainer against the pin head lesser diameter portion and biasing the lesser pin portion into the second aperture portion with the retainer beneath the large head portion of the pin to lock the pin against withdrawal through the slot.

6. A self-locking mechanism for interconnecting a vehicle accelerator pedal connected cable to a carburetor throttle body member, including a first lever connected to the carburetor throttle body and a second member cable connected to the vehicle accelerator pedal for movement thereby, the first lever having a nailhead-like pin projecting from one end comprising a large diameter land connected to a reduced diameter neck-like portion, the second member having a keyhole shaped slot at an end to be engaged by the pin of the first lever, the slot having a stepped diameter opening with a smaller diameter portion of a size to accept only the neck-like portion of the pin therethrough, and a diameter slot opening being of a size to receive the large land and the neck-like portion therethrough, linear movement of the member and lever in a direction to separate the member and lever engaging the neck-like portion in the smaller diameter slot opening after insertion of the large land and neck-like portion through the slot opening, and retainer means to bias the neck-like portion of the pin into the smaller slot opening and lock the pin against withdrawal through the slot, said retainer means including a member slidably attached to the first lever and spring biased into a position overlying a portion of the slot preventing passage of the pin therethrough, the member being movable against the bias to a position uncovering the latter slot portion to permit passage of portions of the pin therethrough, return movement of the retainer member through the slot engaging the retainer with the neck-like portion and moving the reduced neck-like portion of the pin smaller diameter slot opening and a portion of the retainer beneath the larger land to lock the pin against withdrawal through the slot.

* * * * *